Sept. 5, 1961 C. H. WICKENBERG 2,998,915
SLIDE RULE
Filed Sept. 3, 1958
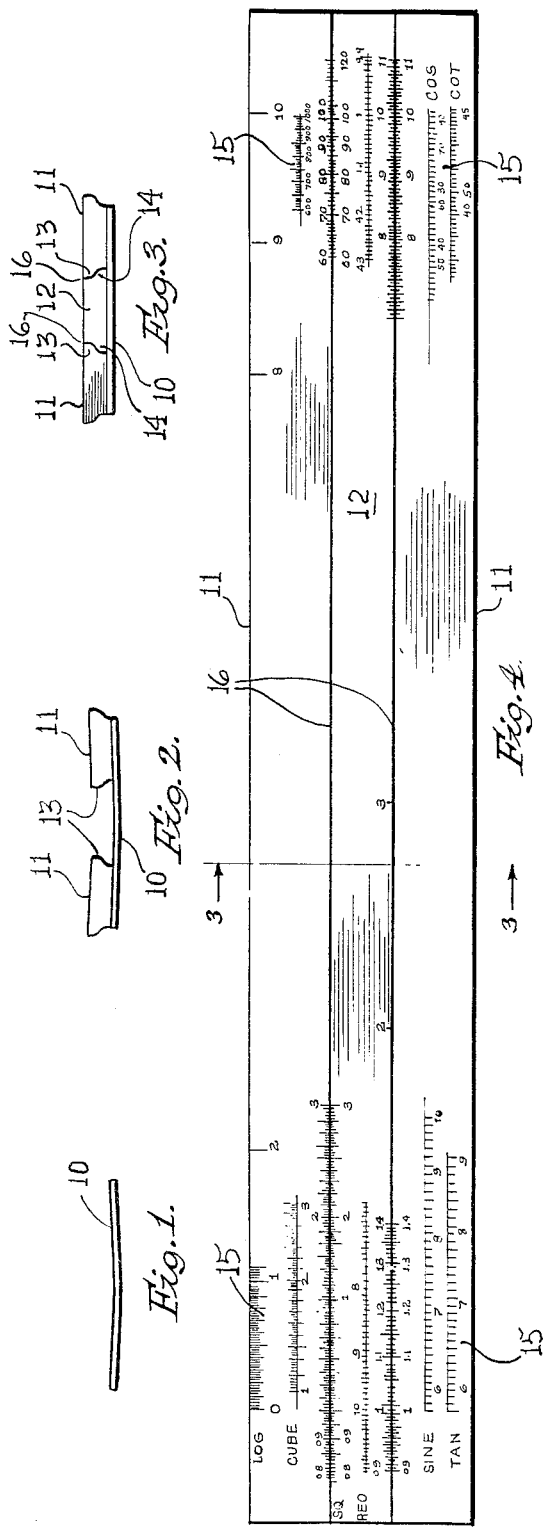
INVENTOR.
CHESTER H. WICKENBERG
BY Threedy & Threedy
HIS ATTORNEYS.

United States Patent Office 2,998,915
Patented Sept. 5, 1961

2,998,915
SLIDE RULE
Chester H. Wickenberg, 329 Congdon Ave., Elgin, Ill.
Filed Sept. 3, 1958, Ser. No. 758,752
2 Claims. (Cl. 235—70)

This invention relates to computing apparatuses and more particularly to a slide rule.

A principal object of this invention resides in the novel construction of the slide rule resulting in economical manufacture while achieving an accurate and easily operable instrument.

A further object of the invention is the provision of a slide rule in which the slide rule is so constructed as to exert a frictional contact on the slide to hold the same in an adjusted position, preventing accidental movement thereof with respect to the guide frames.

Yet another and equally important object of the invention is the provision of a slide rule in which the guide frames and the slide are of identical construction, each being formed from the same mold, thus dispensing with the requirement of a plurality of molds.

Another object of the invention is the provision of a slide rule in which the scale-bearing member is in the form of a decal cemented upon the corresponding faces of the guide frame members and slide after the assembly of the latter and subsequently severing that portion of the scale carried by the slide, by means of a knife blade drawn along the lines of division between the slide and the adjacent edges of the guide frames, thus resulting in maximum accurate alignment between the scales carried by the guide frames and the scales carried by the slide.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is an end view of a base plate embodied in the invention;

FIG. 2 is an end view showing the guide frames cemented or otherwise fixed to the base plate;

FIG. 3 is a sectional detail view taken substantially on line 3—3 of FIG. 4;

FIG. 4 is a plan view of the slide rule;

FIG. 5 is a side edge view thereof.

Referring to the drawings showing my preferred form of construction, a base plate is indicated at 10. This base plate 10 may be formed of any suitable material and in the present instance is of elongated formation and slightly concaved transversely for reasons hereinafter made apparent.

The guide frames are indicated at 11 and the slide at 12. Each of these members 11 and 12 are of identical shape and design, each being formed from the same mold. The guide frames 11 are fixedly secured to the base plate 10 along the opposite longitudinal edges of the latter. To properly space the guide frames 11 from each other, a template in the identical form of the slide 12 is positioned on the plate 10 and the guide frames 11 are then positioned in contact with the longitudinal edges of such template and cemented to the base plate 10. After the cement has hardened, the template is removed.

The guide frames 11 along their longitudinal edges provide overhanging shoulders 13 which overhang the shoulders 14 of the slide 12 when the slide 12 is inserted between the guide frames 11 in an inverted position with respect to that of the guide frames 11.

In inserting the slide 12 between the guide frames 11, the base plate 10 is flexed to a flat condition as shown in FIG. 3. This results in exerting a slight frictional tension of the guide frames 11 against the long edges of the slide 12 whereby to hold the slide 12 in any adjusted position when in use and preventing accidental movement thereof from a selected position.

Upon assembly of the slide 12 upon the base plate 12 between the guide frames 11, a decal bearing scales 15 of any desired type or character is applied or otherwise fixedly secured to the top surface of the frames 11 and slide 12, after which that portion of the decal covering the slide 12 is severed from the portions of the decal covering the top surfaces of the frames 11, by drawing a sharp knife blade along the line of severance indicated at 16 between the guide frames 11 and the slide 12, thus releasing the slide 12 for movement.

The slide 12 can be freely moved relative to the guide frames 11 by flexing the base plate 10 so as to reduce the frictional contact between the contacting edges of the guide frames 11 and the slide 12. When this is accomplished, the slide rule is held between the thumb and index finger and by manipulating the thumb and index finger the base plate 10 may be readily and conveniently flexed.

A slide rule constructed in accordance with the foregoing description provides a perfect fit between the slide and the guide frames without in any way interfering with the movement of the slide relative to such guide frames. Such construction also is economical for the reason that the guide frames 11 and the slide 12 are formed from the same mold and may be used interchangeably in assembly. The manner of applying the scale-bearing members, such as decals, to the guide frames and the slide results in maximum accuracy in alignment between the scales on the guide frames and the scales on the slide. As before stated, the scales may be of any desired graduation or character.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having thus described my invention, what I claim as new and desire to protect by Letters Patent is:

1. A slide rule comprising an elongated base plate formed concaved transversely, guide frames of substantially identical shape secured to and extending along opposite long edges of the base plate in spaced relation with respect to each other and having overhanging shoulders along the opposite long edges thereof, a slide of substantially identical shape as the guide frames and slidably arranged in an inverted position therebetween, said base plate being flexed to a flat condition upon positioning of said slide between said guide frames with the overhanging shoulders of the guide frames positioned over opposite longitudinal edges of the slide to retain the slide between the guide frames.

2. A slide rule comprising an elongated base plate formed concaved transversely, guide frames of substantially identical shape in cross-section and length secured to and extending along opposite longitudinal edges of said base plate in spaced relation with respect to each other and having overhanging shoulders along their opposite long edges, a slide of substantially identical shape in cross-section and length slidably arranged in an inverted position between said guide frames, said slide when inserted between said guide frames in an inverted position provides a portion having a width greater than the distance between the confronting overhanging shoulders of said guide frames so as to flex said concaved base into a flat parallel plane with respect to the top exposed surfaces of said slide and guide frames.

References Cited in the file of this patent

UNITED STATES PATENTS

| | | |
|---|---|---|
| 694,258 | Dennert | Feb. 25, 1902 |
| 2,449,954 | Roberts | Sept. 21, 1948 |
| 2,466,983 | Eckel | Apr. 12, 1949 |

FOREIGN PATENTS

| | | |
|---|---|---|
| 24,498 | Germany | June 11, 1906 |
| 413,308 | Great Britain | July 9, 1934 |